June 11, 1929.  J. A. DIENNER  1,716,371
VACUUM FUEL FEED DEVICE
Filed May 2, 1921   3 Sheets-Sheet 2
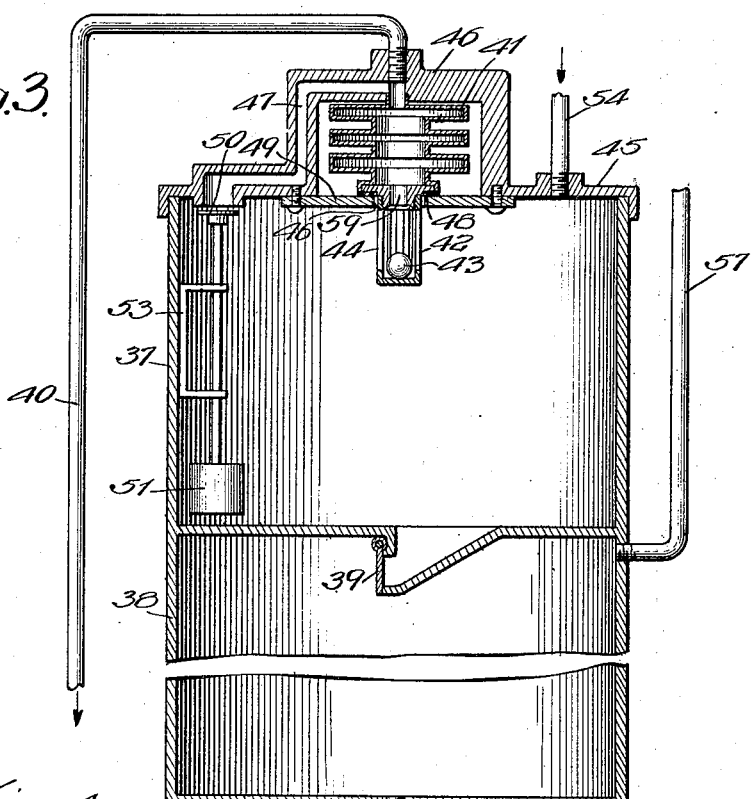
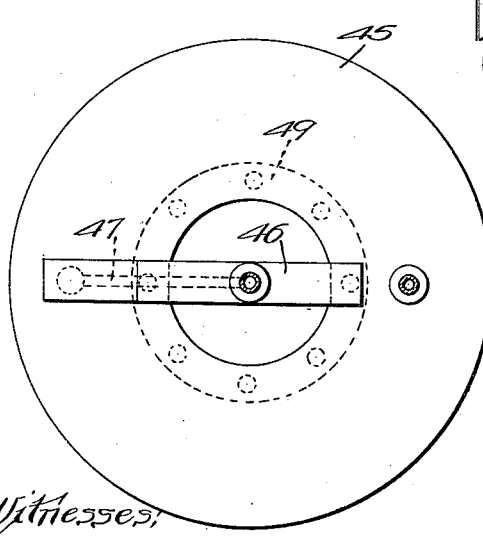
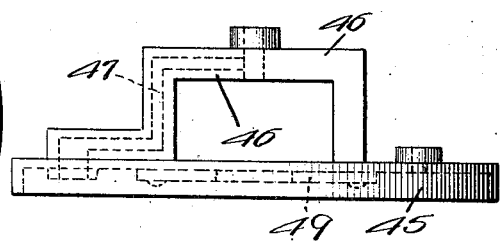
Witnesses:
W. F. Kilroy
Harry R. L. White
Inventor:
John A. Dienner
By Brown, Boettcher & Dienner
Attys.

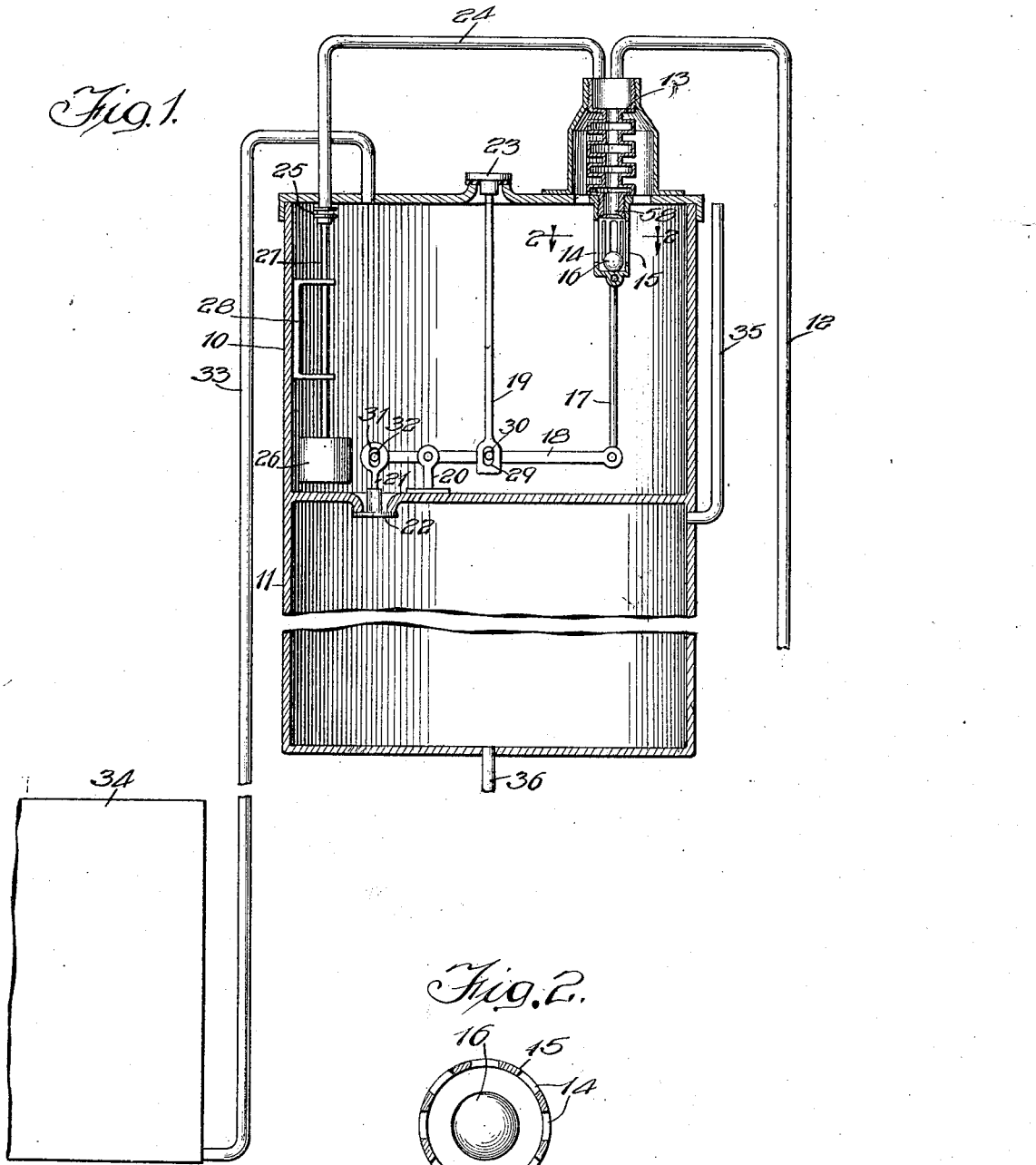

June 11, 1929.  J. A. DIENNER  1,716,371
VACUUM FUEL FEED DEVICE
Filed May 2, 1921  3 Sheets-Sheet 3
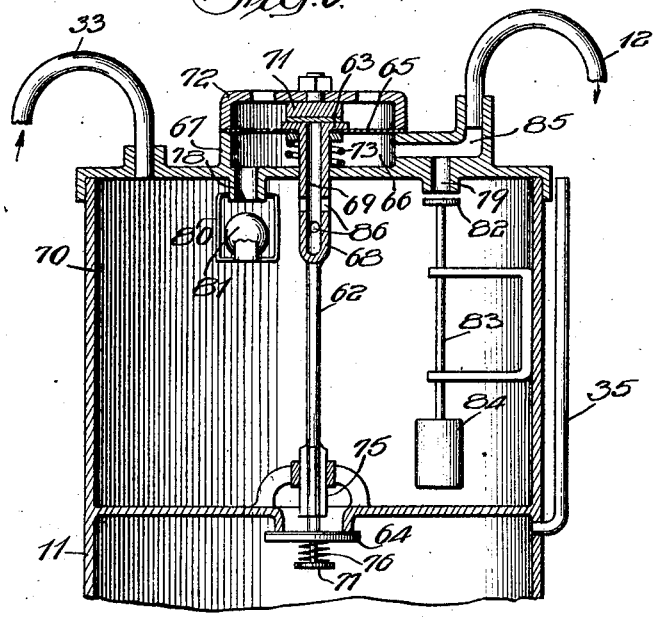
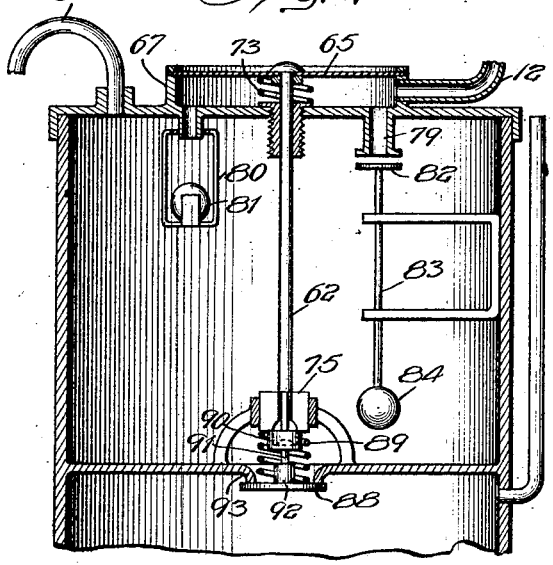
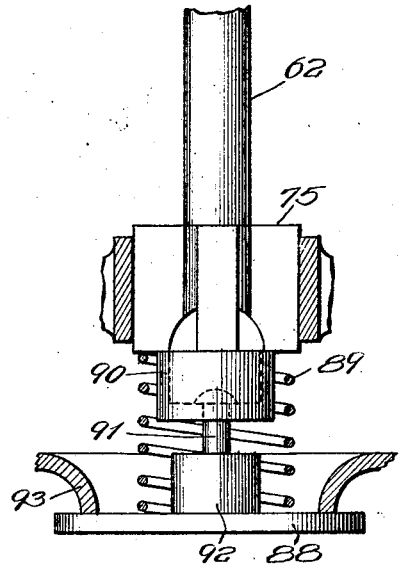

Patented June 11, 1929.

1,716,371

UNITED STATES PATENT OFFICE.

JOHN A. DIENNER, OF CHICAGO, ILLINOIS, ASSIGNOR TO STEWART-WARNER SPEED-OMETER CORPORATION, OF CHICAGO, ILLINOIS, A CORPORATION OF VIRGINIA.

VACUUM FUEL-FEED DEVICE.

Application filed May 2, 1921. Serial No. 466,243.

My invention relates to vacuum fuel feed devices, and contemplates an improved apparatus which may be employed in connection with any internal combustion engine.

It is the purpose of my invention to provide a feed device having power or motor operated valves, whereby positive and reliable action of the valves is obtained.

To supply fuel to a carbureter from a device that is operated by suction and controlled by valves is broadly a matter of prior art. The apparatuses heretofore known and used were, however, subject to inherent difficulties, due to the fact that the valves regulating the flow of the fuel into and out of such devices were float operated. It is a matter of common experience that float operated valves are uncertain in their movement, because of the relatively small difference in specific gravity between a float and the usual liquids employed. In addition, a float operated valve must have a float of considerable volume, and this volume substantially diminishes the capacity of the device as a liquid container.

A further object of my invention is to provide a feed device of a relatively high volumetric efficiency. Float valves, aside from limiting the capacity of a device as a container, as mentioned above, require for successful operation predetermined upper and lower levels, which levels necessarily lie at a considerable distance below the top and above the bottom, respectively, of the container, on account of the large size of the floats. As a result of this, their volumetric efficiency is relatively low. My invention provides a device which permits practically complete filling of the device before the process of evacuation starts, and a relatively complete evacuation for each cycle of operation of the valves.

A further object of my invention is to provide a device of simple construction, and easily accessible for repairs, if necessary.

My invention is illustrated in the accompanying drawings, in which:

Figure 1 is a vertical sectional view of the preferred embodiment of my invention;

Figure 2 is a sectional view along the line 2—2 of Fig. 1;

Figure 3 is a vertical sectional view of an alternative embodiment of my invention;

Figure 4 is a plan view of the embodiment shown in Figure 3;

Figure 5 is an elevational view of the top of the device shown in Figure 3;

Figure 6 is a cross-sectional view of a modification.

Figure 7 is a similar view of another modification; and

Figure 8 is an enlarged detailed view of the liquid valve.

Referring to the drawings, 10 of Figure 1 indicates the upper compartment of the feeding device, and 11 the lower compartment of same. The compartment 10 is connected with the intake of the engine by the suction pipe 12, through the bellows or multi-diaphragm motor 13, and sleeve 14. Slots 15 in the sleeve 14 and port 58 permit entrance of the air and liquid into the sleeve, and the rising and falling of the ball or float valve 16 with the level of the liquid.

Links 17, 18, 19 and 21, and fulcrum 20, constitute a leverage system for operating valves 22 and 23 through movement of sleeve 14 and bellows or motor 13. An auxiliary or control passageway in the form of a pipe 24 connects the motor 13 with the upper compartment 10, and with the suction pipe 12. The connection of pipe 24 with compartment 10 is at certain times cut off by the valve 25, which is operated by the float 26 and stem 27 through the guides 28. The lower end of stem 19 has a slot 29 permitting motion between the pin 30 and the lever 18. The purpose of this lost motion is to permit valve 23 to seat by gravity when the downward movement of arm 18 closes valve 22. The upper end of piece 21 has a slot 31 permitting motion about pin 32. The purpose of this is to permit the motor 13 to open the valve 23 ahead of the valve 22. The suction pipe 33 connects the compartment 10 with the supply tank 34. A vent pipe 35 maintains atmospheric pressure in the lower compartment 11, and pipe 36 carries the liquid by gravity from compartment 11 to the float chamber of the carbureter.

The operation of the preferred embodiment of my device as illustrated in Figures 1 and 2 is as follows:—

Assuming that the upper compartment 10 is substantially empty, operation of the engine tends to produce a vacuum in the pipe 12 and the compartment 10. The valves 22 and 23 are closed by the weight of the arm 18 and by gravity, respectively, and the difference in pressure between the inside of the chamber 10 and the outside atmosphere tends to hold these valves firmly to their seats. Liquid rises from the tank 34 through the pipe 33 and flows into the pumping chamber 10. The air which is being withdrawn by way of the pipe 12 passes through both the pipe 24 and the passageway 58. As soon as the liquid raises the float 26, the valve 25 is closed, but this has no effect at this time other than to prepare the apparatus for a later operation, namely, that of actuation of the motor 13. This valve 25 remains closed until the liquid again drops below the predetermined low level. The flow of the liquid continues until the float 16 rises to close off the port 58. Thereupon, continuation of suction causes the motor 13 to contract, due to greater pressure prevailing in the chamber 10 than in the interior of the motor, with the result that the valve 23 is first forced from its seat to admit atmosphere, and then the valve 22 is forced from its seat to permit the discharge of the liquid contents. The motor 13 is made of sufficient effective area to open invariably the valve 23 against atmospheric pressure. As soon as the valve 23 begins to move from its seat, the entry of air into the chamber 10 accelerates the movement of the motor 13. The valve 23 is preferably provided with a yielding face, as are also the valves 25 and 22.

Thereupon, the liquid is discharged by gravity past the open valve 22 until low level is reached, whereupon the float 26 pulls the valve 25 away from its seat against the pressure of the atmosphere, which tends normally to hold it tight, permitting an inrush of air into the motor 13, thereby breaking the vacuum, permitting the ball-valve 16 to drop from its seat 58, and the valves 22 and 23 to be closed by dropping of the lever arm 18 and the motor 13. The device is then in condition for repeated operation.

It will be noticed that the connections of the valves 22 and 23 with the lever 18 provide lost motion whereby the valve 23 may be first opened, and thereafter the valve 22 is opened.

It is evident that this invention provides a device which works automatically and positively through valves actuated by a motor, and that the level controlled valves operate only as controls for the motor valve, whereby reliable and positive movement of the valves is obtained, combined with a maximum degree of volumetric efficiency.

In the alternative embodiment illustrated in Figures 3, 4 and 5, the upper compartment 37 is connected with the lower compartment 38 through the flap valve 39, and with the engine through the suction pipe 40, the port 59 of motor 41, and the guide 42. The guide or cage 42 contains a floating ball valve 43 and has slots 44 in its walls for the admission of air and of liquid. The cover 45 has a bridge 46 which holds the motor 41 in place, and contains a cored control passageway 47 from the motor 41 to valve 50 in the upper compartment 37. The valve 48 at the upper end of the guide 42 rests upon the adjacent edges of the disc 49 forming therewith a valve and seat arrangement. The disc 49 contains an opening 46 in which the guide 42 itself is guided, and is permitted to move to open valve 48 when actuated by the bellows or motor 41.

The cored inlet 47 is at certain times shut off from connection with the upper compartment 37 by a valve 50 which is actuated by a float 51 through a stem held in the guides 53. The feed pipe 54 connects the upper compartment 37 with a storage tank for the liquid. The supply pipe 56 connects the lower compartment 38 with the carbureter. The vent pipe 57 maintains the lower compartment 38 at atmospheric pressure.

The operation of the alternative embodiment of my device illustrated in Figures 3, 4 and 5 is as follows:—

Operation of the engine creates a vacuum in the pipe 40, and since the valves 39 and 48 are closed, this vacuum is effective, in the motor 41, the upper compartment 37 and the pipe 54 leading to the supply tank, causing flow of the liquid from the supply tank into the upper compartment 37. As soon as the liquid rises above low level the valve 50 is closed. As the level of the liquid approaches the top of the compartment, the ball 43 in the guide 42 is raised to a point where it shuts off the opening 59 connecting the motor 41 with the guide 42. Thereupon the motor 41 is subjected to suction causing it to shorten and lift with it the guide 42, opening the valve 48 against the force of suction tending to hold it on its seat, permitting the atmosphere to enter the compartment 37 between the valve 48 and the seat on the disc 49. Since both the compartments 37 and 38 are at atmospheric pressure, gravity will cause the liquid to flow past the flap valve 39 into the compartment 38 until the level of the liquid is lowered to the point where the float 51 opens the valve 50.

The opening of the valve 50 restores atmospheric pressure in the by-pass 47 and the motor 41, permitting the latter to expand and carry with it the guide 42 carrying the valve 48 to its seat on the disc 49, and again closing the compartment 37 to atmospheric pressure, thus completing the cycle with the dropping of the ball 43 to the bottom of the cage. The valve 48 has a yielding seat permitting it to form a tight seat.

This embodiment of my device offers the same advantages as the preferred embodiment, viz, volumetric efficiency, and certainty and positiveness of valve action.

In Figure 6 I have shown a modification, in which a common valve stem 62 moves downwardly for opening the atmospheric inlet valve 63, and the liquid discharge valve 64. A flexible diaphragm 65 is mounted upon a chamber 66 having a cylindrical rim or flange 67, and a tube 68 is secured preferably centrally of the diaphragm, the tube being open at its upper end to provide a valve port. The passageway 69 in the tube 68 is adapted to provide a communication between the atmosphere and the interior of the pumping chamber 70 when the stem 62 is moved downwardly, as will be described later. An adjustable valve member 71 is mounted upon a bridge 72, which bridge also serves as a clamping ring for clamping the diaphragm 65 over the top of the chamber 66. A spring 73 tends to raise the stem 62 and associated parts to close the passageway 69 by means of the yielding face of the valve 71. The tube 68 joins the stem 62, upon which stem is mounted the liquid discharge valve 64. The valve 64 when open rests against a shoulder formed by the guiding wings 75 on the lower end of the stem being passed against said shoulder by means of a spring 76, lying between said valve and a collar 77. In order to secure a tight joint at both the valves 64 and 71, it is advisable to have one of the valves relatively movable with respect to the other or to the stem, so that slight inequalities in construction will not prevent both valves from seating. Hence, instead of having the liquid discharge valve 64 movable with respect to the stem 62, I may mount the atmospheric inlet 71 on a spring mounting, so as to permit play between the air admission valve and its co-operating seat 63.

The chamber 66 is in constant communication with a source of suction by way of the pipe 12, and this chamber has two outlets, namely, the valve port 78 and the valve port 79. The valve port 78 has a cage 80 secured thereto for a floating valve 81, in this case shown as a floating ball. The form of the valve 81 may be varied; a cylindrical shape would serve equally well. The valve 81 is adapted to be brought against the valve seat 78 upon the occurrence of high level conditions in the pumping chamber 70. A low level controlled valve 82 is adapted to engage the seat 79 to close off the corresponding passageway, upon the inflow of liquid through the pipe 33. This valve is connected by a stem 83 to a low level float 84, which float is adapted to open the valve 82 when the pumping chamber is substantially empty of liquid. The operation of this form of the device is as follows:—Assuming that the pipe 12 is connected to the intake manifold of the engine, and the pipe 33 to the fuel tank 34, and that the pumping chamber 70 is substantially empty, both valves 71 and 64 will be closed because of the action of the spring 73. The valves 81 and 82 will be opened, because they are not supported by liquid. The action of suction through the pipe 12 is to cause the discharge of liquid trough the pipe 33 until the float 84 is raised sufficiently to close the valve 82. This, however, does not affect the action of suction on the chamber 70, since air is still free to flow therefrom through the passageway 78, chamber 66, passageway 85 and pipe 12. As soon as the level rises to the point where the float valve 81 is floated to seat, a further movement of air from the pumping chamber is prevented. Thereupon, the suction in the chamber 66 becomes greater than the suction in the chamber 70, due to two factors, namely, the inflow of liquid through the pipe 33, and the outflow of air from the chamber 66. The result is that atmosphere, present on top of the diaphragm 65, exerts a pressure great enough to force the valve seat 63 away from the valve 71, opening the passageway 69 to atmosphere. Further downward movement of the stem 62 causes the shoulder below the enlargement 75 to engage the valve 64 and thrust it away from its seat, thereby permitting the liquid to discharge into the receiving tank 11. This flow occurs quickly, due to the free entry of atmosphere through the passageway 69 and openings 86, and the free passage of liquid past the open valve 64.

The diaphragm 65 remains in its deflected position until the suction in the chamber 66 is relieved or broken. I have shown the tube 68 as passing through the bottom wall of the chamber 66, with a fairly close fit, and without packing. If desired a seal may be maintained at this fit, but absolute tightness is not essential, since the area of the diaphragm 65 may be made as large as is necessary for the purpose of opening the valves 71 and 64.

As soon as the level of the liquid recedes to a point below the flotation center of the float 84, this float will open the valve 82, permitting an inrush of atmosphere to break the vacuum in the chamber 66, whereupon the ball-valve 81 drops by gravity from its seat, and the stem 62, with its connected valves 63 and 64, arises, closing the corresponding valves for the next pumping operation.

In Figures 7 and 8 I have illustrated a modified form of device in which no atmosphere admission valve is provided. In this case the liquid valve 88 opens and permits both the liquid to discharge and atmosphere to enter. This is permissible because of the large area of opening of the valve 88. I have provided a spring between the valve 88 and the shoulder below the wings 75. A lost motion connection in the form of a headed pin 91 held by the hollow projection 90 permits the spring to be first compressed when the stem 62 is moved down then the projection 90 engages projection 92 on the valve breaking the valve from its seat and permitting the spring 89 to throw the valve clear of the valve seat 93. I believe that the operation of this form of my device is clear from the description of operation given in connection with Figure 6.

I do not intend to limit the invention to the precise details described and illustrated.

I claim:

1. In a liquid elevator operating by the pressure of an elastic fluid, a chamber having an opening communicating with the atmosphere, a valve controlling the opening, said valve being held to seat when the chamber is under reduced pressure, a motor for controlling said valve, and a valve for controlling the application of reduced pressure to the motor.

2. In a vacuum pumping device including a pumping chamber with an air inlet and a liquid discharge port, two suction inlets with valve means therefor including two relatively small float devices positioned respectively in the upper and lower portions of said chamber, said devices operating to close the respective suction inlets by the buoyant action of the liquid, the float in the lower part of the chamber being designed to act as a weight to open its suction inlet as the liquid reaches low level.

3. In a vacuum pumping device a pumping chamber with an air inlet valve adapted to be held closed by vacuum in the chamber, a suction port for the chamber; a suction operated motor connected for opening said air valve, a relatively small float device in the upper part of the chamber arranged to cut off the suction from the chamber and apply it to the motor as the liquid reaches high level, and a second suction port with a second relatively small float device operable by the liquid as it reaches low level for restoring suction in the chamber.

4. In a vacuum pumping device, a pumping chamber, an air inlet valve and a liquid discharge valve therefor, both adapted to be held closed by vacuum in the pumping chamber, a suction port in the chamber, a suction-operated motor connected for opening said air valve and discharge valve, a relatively small float device in the upper part of the chamber arranged to cut off the suction from the chamber and apply it to the motor as the liquid reaches high level, and a second suction port with a relatively small float device disposed in the lower part of the chamber, operable for opening said port and restoring the suction as the liquid reaches low level.

In witness whereof, I hereunto subscribe my name this 6th day of April, 1921.

JOHN A. DIENNER.